US006774899B1

(12) United States Patent
Ryall et al.

(10) Patent No.: US 6,774,899 B1
(45) Date of Patent: Aug. 10, 2004

(54) DRAWING GRAPHS USING USER SELECTABLE VISUAL ORAGNIZATION FEATURES AND/OR OTHER USER CONTROLLED CONSTRAINTS

(75) Inventors: Kathy Ryall, Charlottesville, VA (US); Joseph Marks, Belmont, MA (US); Stuart Merrill Shieber, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1181 days.

(21) Appl. No.: 08/932,725

(22) Filed: Sep. 18, 1997

(51) Int. Cl.[7] .............................................. G06F 3/00
(52) U.S. Cl. ..................................... 345/440; 345/356
(58) Field of Search ................................ 345/440, 356

(56) References Cited

U.S. PATENT DOCUMENTS

| | | | | | |
|---|---|---|---|---|---|
| 5,193,183 | A | * | 3/1993 | Bachman ........................ | 707/1 |
| 5,276,789 | A | * | 1/1994 | Besaw et al. ................... | 345/440 |
| 5,278,951 | A | * | 1/1994 | Camacho et al. ............... | 345/440 |
| 5,287,439 | A | * | 2/1994 | Koga et al. ..................... | 345/433 |
| 5,381,343 | A | * | 1/1995 | Bamji et al. .................... | 364/488 |
| 5,450,535 | A | * | 9/1995 | North ............................. | 345/340 |
| 5,450,540 | A | * | 9/1995 | Spohrer et al. ................. | 345/339 |
| 5,452,238 | A | * | 9/1995 | Kramer et al. ................. | 345/433 |
| 5,745,122 | A | * | 4/1998 | Gay et al. ....................... | 345/433 |
| 5,764,239 | A | * | 6/1998 | Misue et al. .................... | 345/440 |
| 5,786,820 | A | * | 7/1998 | Robertson ....................... | 345/357 |
| 5,815,154 | A | * | 9/1998 | Hirschtick et al. ............. | 345/356 |

FOREIGN PATENT DOCUMENTS

WO    WO 98/29820   *  7/1998   ........... G06F/17/50

OTHER PUBLICATIONS

Henry, T.R. and Hudson, S.E., "Interactive Graph Layout", Proc. on the Association of Computing Machinery Symposium on User Interface Software, New York: ACM, pp. 55–64, Nov. 1991.*

Tonouchi, Toshio et al., "Creating Visual Objects by Direct Manipulation", Proc. of the 1992 Institute of Electrical and Electronics Engineers Workshop on Visual Languages, pp. 95–101. Los Alamitos: IEEE Comp. Soc. Press, pp. 95–101, Sep. 1992.*

Dangler, Ed. et al., "Constraint–Driven Diagram Layout", Proc. Institute of Electrical and Electronics Engineers Symposium on Visual Languages, Los Alamitos: IEEE Comp. Soc. Press, pp. 330–335, Aug. 1993.*

Kosak, Corey et al., "Automating the Layout of Network Diagrams with Specified Visual Organization", Institute of Electrical and Electronics Engineers Trans. on Systems, Man, and Cybernetics, vol. 24, No. 3, pp. 440–454, Mar. 1994.*

Galindo, Diana et al., "Perceptually–Based Representation of Network Diagrams", Proc. of the 4th International Conference on Document Analysis and Recognition, v. 1, Los Alamitos: IEEE Comp. Soc. Press, pp. 352–356, Aug. 1997.*

* cited by examiner

*Primary Examiner*—Sanjiv Shah
(74) *Attorney, Agent, or Firm*—Dirk Brinkman (57) ABSTRACT

A system for interactive manipulation of graphs by a user applies constraints to obtain a visually pleasing display. The user adds nodes and edges to the graph. Visual Organization Feature (VOF) constraints are then applied to the nodes. The system uses a generalized spring algorithm to apply the constraints. Springs are attached to selected nodes to which a constraint is to be applied. The length and the second end-point of each spring are set based upon the constraint which is to be applied. The system then determines by simulation at-rest positions for all of the nodes based upon the springs. As the user adds, changes or deletes VOFs or changes the positions of the nodes, the graph is automatically reconfigured based upon the constraints. A user interface in connection with the graph drawing system provides a display for the graph and selection buttons for applying the VOFs.

16 Claims, 6 Drawing Sheets

| | | |
|---|---|---|
|  SEQUENTIAL PLACEMENT |  | Fig. 3a |
|  CLUSTERING |  | Fig. 3b |
|  ZONING |  | Fig. 3c |
|  T - SHAPE |  | Fig. 3d |
|  ALIGNMENT |  | Fig. 3e |
|  EVEN SPACING |  | Fig. 3f |
|  SYMMETRY |  | Fig. 3g |
|  HUB SHAPE |  | Fig. 3h |

DRAWING GRAPHS USING USER SELECTABLE VISUAL ORAGNIZATION FEATURES AND/OR OTHER USER CONTROLLED CONSTRAINTS

FIELD OF THE INVENTION

The present invention relates to a computerized system for drawing graphs. More particularly, it relates to an interactive, constraint-based graph-drawing system.

BACKGROUND OF THE INVENTION

Most small graphs, such as those that appear in publications or presentations, are drawn with the aid of primitive commercial drawing tools, like PowerPoint from MicroSoft or Claris Draw. These drawing tools do not make it easy to introduce and maintain the exquisite symmetries, spacings and alignments that graphic designers typically utilize in their work. Typically, these tools merely allow the placement of nodes on a screen and connection lines between the nodes. The user can interactively move the nodes about on the screen in order to improve the visual appearance of the graph. Often, the user may also apply simple constraints to organize the nodes on the screen. For example, the user can select a set of nodes which are then aligned horizontally or vertically. However, the graph-drawing algorithms only apply the constraint once; if the user subsequently changes a node, the system does not automatically realign the nodes.

Other, more complicated systems use layout algorithms in order to set certain constraints or goals for the layout of a graph. These constraints or goals allow portions of the graph to be set automatically. Generally, graph-layout algorithms minimize specific fixed properties in order to improve the readability and esthetic appearance of graphs. Such properties include maximization of display symmetry, minimizing edge crossings or edge bends, limiting edge lengths to be more uniform, and uniformly distributing nodes. However, minimization of these properties can be an extremely difficult computational problem. Thus, laying out graphs with such systems can be extremely long and tedious. Furthermore, even when the properties are easily minimized, an acceptable graph is not necessarily obtained. Primarily, this is because automated layouts do not consider what the user deems to be important. No specific layout structure is relevant to all types of graphs. Thus, the best layout depends upon the user's purpose for the graph, not universally relevant geometric properties of a display. In this regard, user input is extremely important.

Tyson R. Henry and Scott E. Hudson disclose a system in "Interactive Graph Layout", *Proceedings of the ACM Symposium on User Interface Software and Technology*, page 55 (November, 1991) for composing graph layouts which provide some automation of layout as well as user control. As disclosed in this article, the user interacts with the system to designate a hierarchy of layout algorithms. However, this system is intended for large graphs and is extremely complicated. It requires an understanding of the hierarchical relationship in setting algorithms. Although constraints have permanence, the final layout is not intuitively obvious from the constraints themselves. Since contraints are hierarchically arranged, the effects of some constraints will be modified or cancelled by the application of other constraints. Particularly, the permissible constraints appear to maximize certain distances to create uniformity in the graph. Sometimes for readability, the user would like disuniformity in a graph in order to emphasize certain areas.

Ed Dengler, Mark Friedell and Joe Marks, in "Constraint-Driven Diagram Layout", *Proceedings of the 1993 IEEE Symposium on Visual Languages*, pp 330–335 (August, 1993) disclose a system for using constraints in diagram layouts. This system is based upon the use of visual organization features (VOFs). VOFs are specific arrangements of related nodes in the diagram. The system in this article does not describe or presume where the VOFS come from. Rather, it is merely a system for producing a layout result based upon the nodes, edges and VOFS. The layout is optimized using a hybrid process of simulation and stochastic search in order to meet the constraints. Also, the spring constraints are applied in the incremental process in a specified order. The order is determined by the extent of restrictiveness of a constraint. This tries to prevent the incremental improvement approach from being trapped at local optimums. Also, in the Dengler et al. approach, an initial layout is randomly selected. In order to provide improved performance, several different random initial locations can be used. The optimums obtained from each of the initial locations are compared to determine a global optimum in meeting the constraints.

SUMMARY OF THE INVENTION

The deficiencies of known systems for drawing small graphs exquisitely are substantially overcome by the present invention which relates to an interactive system for drawing graphs using constraints. In this system, constraints, nodes and edges are added or deleted from a displayed graph by the user through an interface. With each change, the system redetermines dynamically the position of the nodes and edges based upon the constraints. A generalized spring algorithm is used to enforce the constraints and provide locally optimum placement of the nodes with respect to all constraints. Furthermore, the present invention includes a small set of macro constraints which can be applied to the graph. These constraints are specifically designed for a graph drawing. They are "macro" in that they relate to complex relationships between nodes such as symmetry rather than simple geometric or topological relationships, such as tangency or connectedness relationships between specified points on nodes.

DETAILED DESCRIPTION

Figure 1:
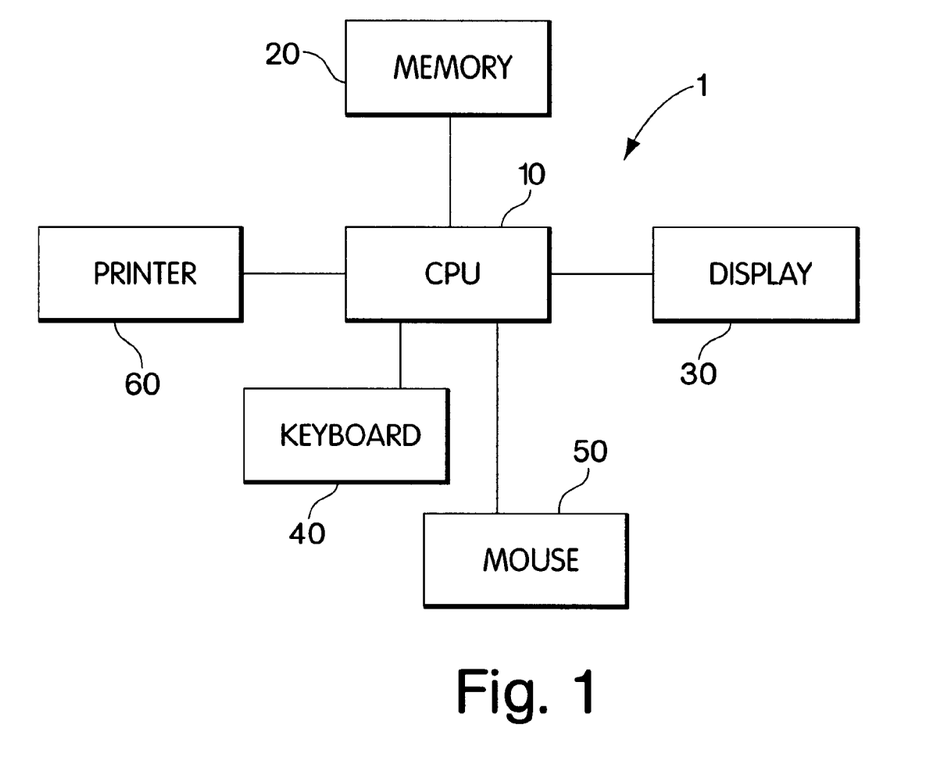
FIG. 1 illustrates computer hardware which can be used for implementing the interactive graph drawing system of the present invention.

FIG. 1 illustrates computer hardware 1 which can be used in implementing the present invention. A central processing unit (CPU) 10 processes program steps in order to implement the processes of the present invention. The CPU 10 can be any type of processor, such as those used in general purpose computers for executing instructions. A memory 20 stores the program steps and also stores the data used to represent the graphs in the present invention. The memory 20 can be any type of memory including RAM, ROM, CD-ROM, magnetic disks or other digital storage medium. A display 30 is connected to the CPU for interacting with the user in displaying the status of the graph. The display also represents the constraints which have been placed upon the graph as discussed below with respect to the user interface. A keyboard 40 and mouse 50 are connected to the CPU 10 for input from the user. As the user inputs information on the keyboard 40 or mouse 50, the CPU 10 processes the information and modifies the graph accordingly. A printer 60 may also be connected to the CPU in order to make a hard copy of the graph when complete.

Figure 2:
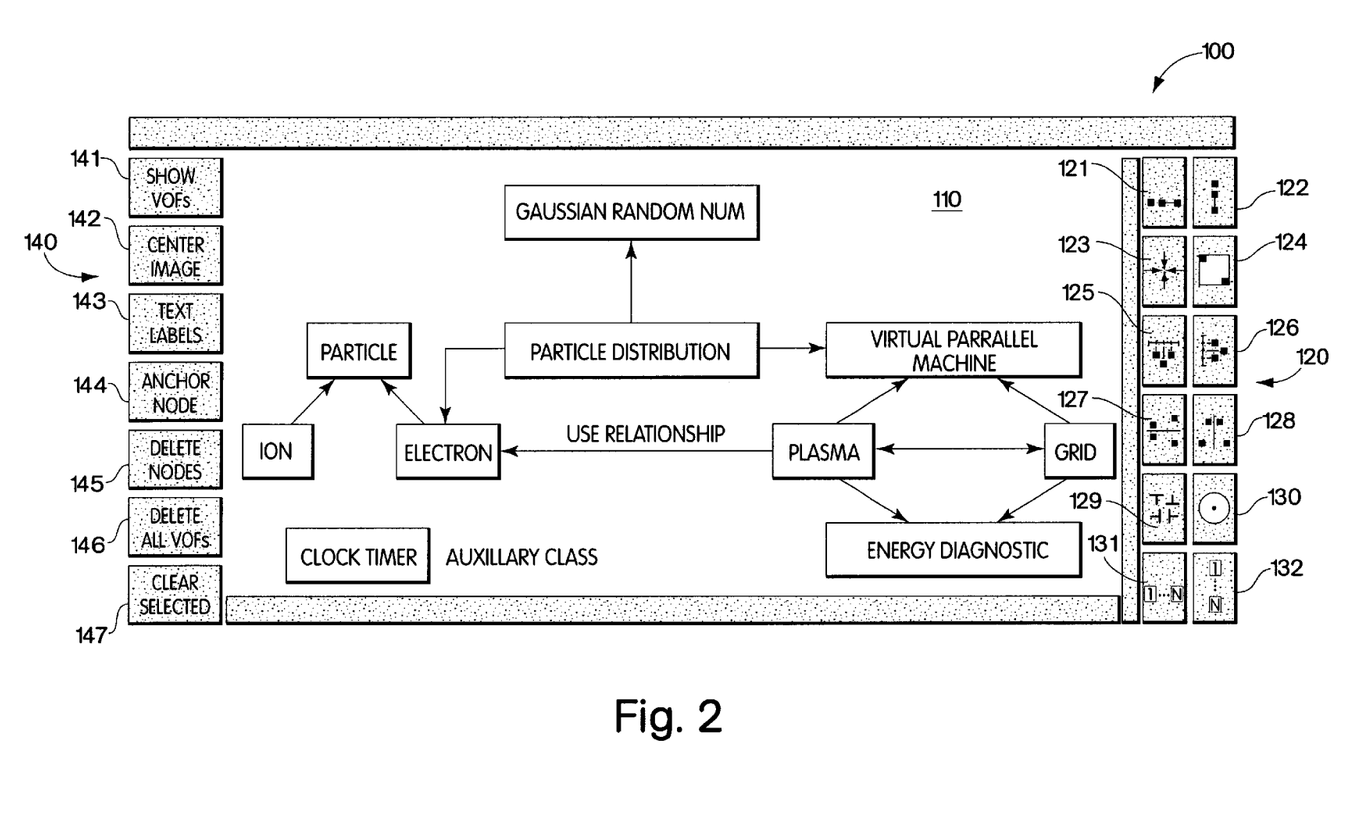
FIG. 2 illustrates a user interface operable with the present invention.

FIG. 2 illustrates a user interface 100 which can be used in executing the processes of the graph. The interface 100 represents a display of information as it would appear on the display 30 connected to CPU 10. The graph display area 110 of the user interface 100 displays the nodes and edges in the graph. The graph information in the memory 20 is processed by the CPU 10 in order to generate node locations and sizes, labels and edges to be displayed on the display 30. A set of buttons 120 are used for selecting and applying visual organization features (VOFS) to different nodes in the graph. A user would manipulate the mouse 50 in order to select specific nodes to which the VOF is to be applied. Once the nodes were selected, the user selects the appropriate VOF to apply by using the buttons 120 A second set of buttons 140 provide additional features in operating the interface. For example, selection button 141 is used to show the VOFs on the display and can be selected or deselected. Selection button 142 centers the graph on the display. Selection button 143 is used for adding or changing text labels. Selection button 144 is used to anchor nodes to specific locations. Section button 145 is used to delete nodes. Selection button 146 deletes all the VOFs which have been applied. Selection button 147 is used to clear selections of specified nodes. Nodes can be selected by clicking one of the mouse buttons when a cursor is located over the appropriate node. Of course, other mechanisms could be used for selecting and applying VOFs to the graph. For example, pull-down menus can be used in place of displayed selection buttons.

Figure 3A:
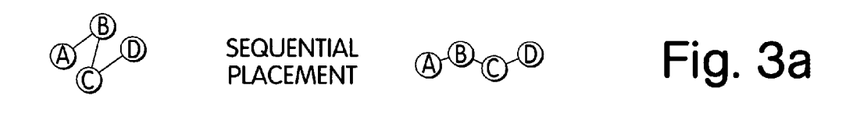
FIGS. 3A–3H represent application of visual organization features.
Figure 3B:
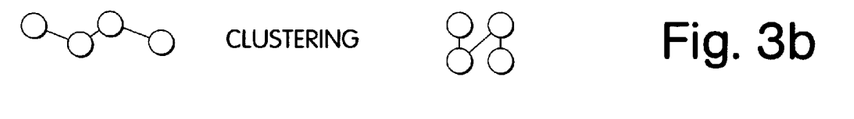
Figure 3C:
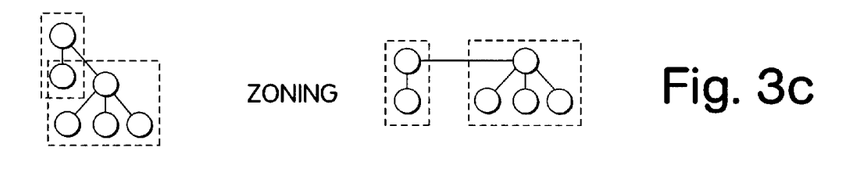
Figure 3D:
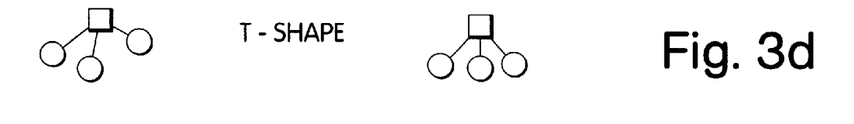
Figure 3E:
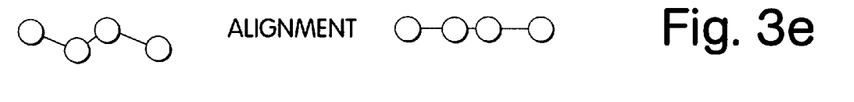
Figure 3F:
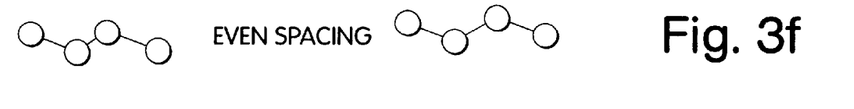
Figure 3G:
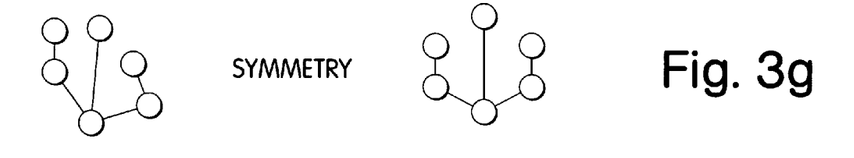
Figure 3H:
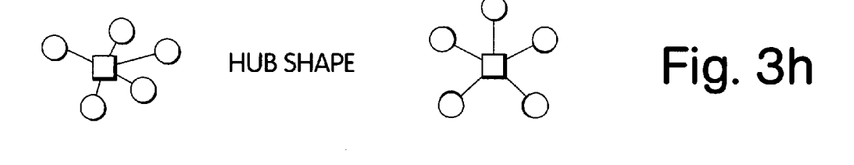

The VOFs corresponding to the selection elements in the first set of selection buttons 120 are illustrated in FIGS. 3A–3H. FIG. 3A illustrates sequential placement of nodes. This can be selected either in the horizontal (selection button 131) or vertical (selection button 132) direction. In sequential placement, the nodes are selected in a specified order; when this constraint is satisfied the nodes are placed either horizontally or vertically in that order on the display. FIG. 3B illustrates clustering which causes all the selected nodes to be placed near to each other. FIG. 3C illustrates zoning (selection button 124). In zoning, the nodes are enclosed within a rectangle. All the nodes selected are maintained within the rectangle and any unselected nodes are maintained outside the rectangle. As illustrated in FIG. 3C, zoning can be used for different groups of nodes. FIG. 3D illustrates T-shaped constraints (selection button 129). In T-shape a center node is centered above or below an aligned row of other nodes. Alternatively, T-shape may place the centered node to the left or right of the row of nodes. FIG. 3E illustrates alignment in which all the nodes are placed along a single line in either the horizontal (selection button 121) or vertical (selection button 122) direction. FIG. 3F illustrates even spacing in which all the nodes are separated by a common distance in either the horizontal (selection button 125) or vertical (selection button 126) direction. FIG. 3G represents symmetry. With symmetry, all the nodes are positioned to be symmetrical about a defined axis identified by the user. The axis may be in either the horizontal (selection button 127) or vertical (selection button 128) direction. Finally, FIG. 3H illustrates a hub-shape design in which all the selected points are equidistant from a center node. The hub shape is selected by selection button number 130. If a center node is not selected by the user, all of the selected nodes become points on the circumference of a circle equidistant from an average position of the nodes.

Figure 4A:
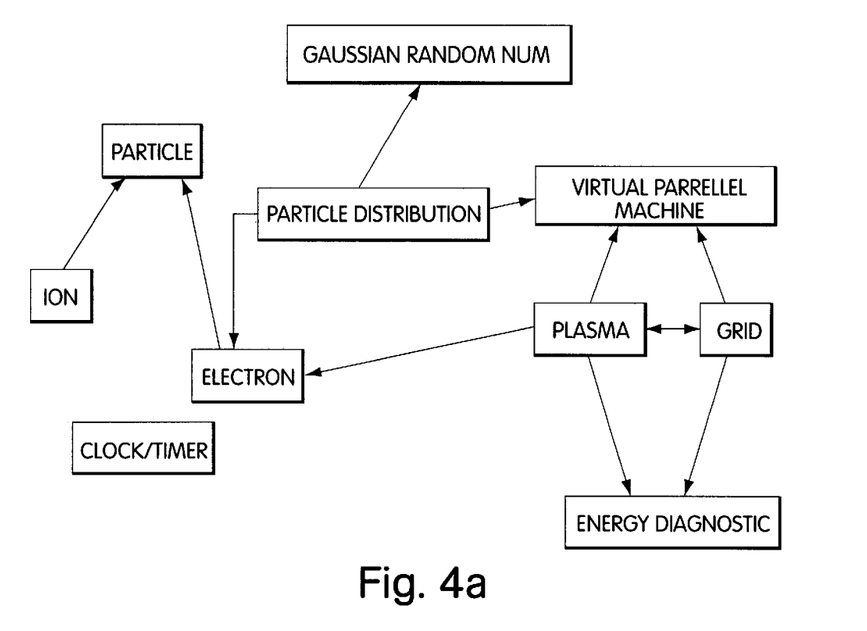
FIGS. 4A–4D illustrate the steps in drawing a graph and applying constraints in accordance with the present invention.
Figure 4B:
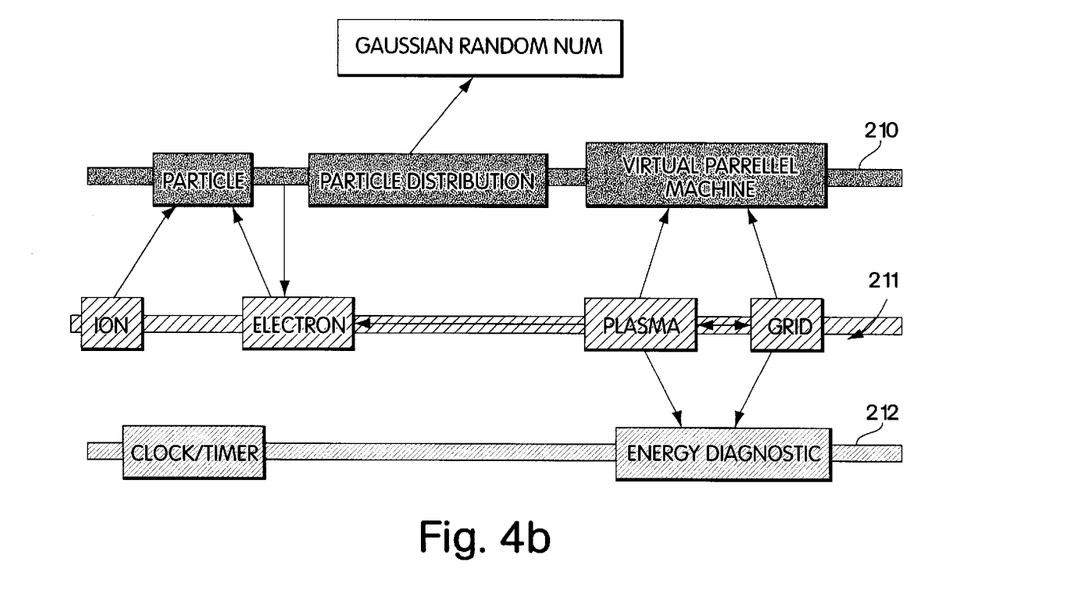

FIGS. 4A–4D illustrate operation of the system in designing a graph. As illustrated in FIG. 4A, a graph consists of a group of nodes 500–518 and edges 520–534 connecting the nodes. The user identifies the characteristics of the nodes, and the labels for the nodes. The nodes are automatically generated to have sufficient space for the label. In FIG. 4A, the nodes have been somewhat arbitrarily placed upon the screen. The user then applies different VOFs in order to improve the visual appearance of the graph. As illustrated in FIG. 4B, the user has applied three VOFs for horizontal alignment 210, 211, 212. A VOF is applied by selecting the nodes and selecting the VOF constraint.

Once the VOF constraint is selected, the system automatically readjusts the nodes in order to meet that constraint and any pre-existing constraints. Each upper-level constraint is converted into a set of specific forces acting on the nodes. A generalized spring algorithm is used for positioning the nodes. The generalized spring algorithm results in a locally optimum satisfaction of all of the applied VOF constraints. In the generalized spring algorithm, all the nodes are treated as having a set of springs connecting them to certain points to each other. The springs are defined in order to meet the constraint objective. For example, in an alignment VOF, a set of zero-length springs connect each node to a horizontal or vertical line through the centroid of the points. A cluster VOF places springs pair-wise among the nodes with a short rest-length spring.

The use of the spring algorithm allows placement without a firm adherence to the contraints. Each node is located based upon all of the forces (contraints) acting on it, and may not perfectly meet any one constraint. For example, without any other constraints, all of the selected nodes to which an alignment VOF has been applied lie upon the line through the centroid. As more constraints are applied, some nodes may not actually lie on the line through the centroid, as forces from other constraints act on the nodes. However, the algorithm balances all the constraints acting on the nodes.

In the system of the present invention, the mass-spring model is continuously animated in order to illustrate the effect of the selected VOFs. Thus, as the user adds VOFs (or removes them), the nodes are moved about on the screen to reflect the changes. The user may also move nodes or groups of nodes in the display. As the nodes are moved, the system redetermines the positioning based upon an at-rest position for the springs. User movement of the nodes allows the user to aid the system in finding a better global solution to the constraint. The mass-spring simulation is used in order to create a cooperative effort between the user and the system to obtain a pleasing layout. The system interprets each of the user's changes and applies all of the constraints simultaneously in the best way possible. The user can then manipulate the nodes and constraints in order to obtain a desired effect while meeting certain specified visual constraints.

Figure 4C:
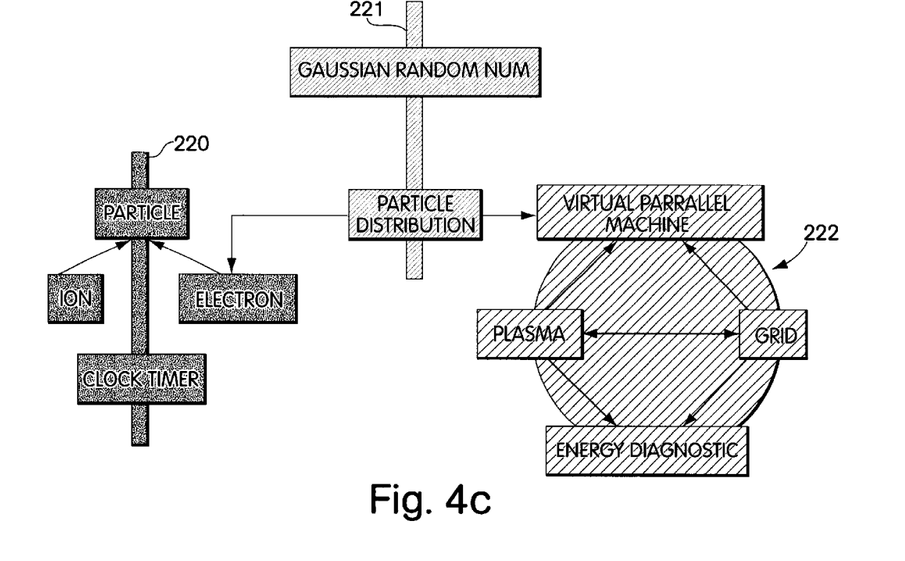
Figure 4D:
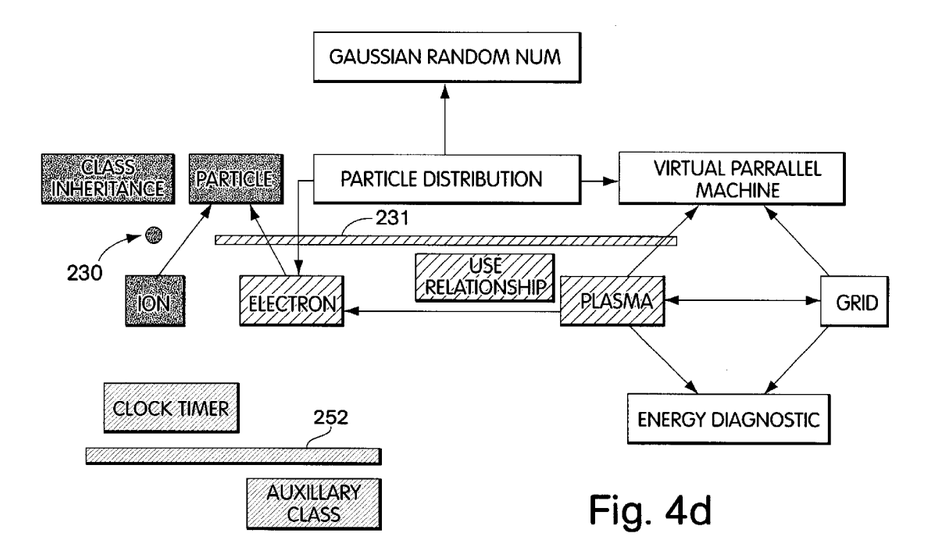

FIG. 4C illustrates three additional constraints, a vertical symmetry 220, vertical alignment 221, and hubshape 222. In the hub shape 222, no center node is selected. As discussed above, each of the elements is placed at an equidistant location from a derived centroid of all of the selected nodes. FIG. 4D illustrates the addition of three more VOFs to obtain the graph structure illustrated in FIG. 2. The three nodes on the left are subject to the cluster VOF illustrated by dot 230. The three nodes in the middle are subject to even spacing 231. Horizontal alignment is applied to the two nodes in the lower left.

Figure 5:
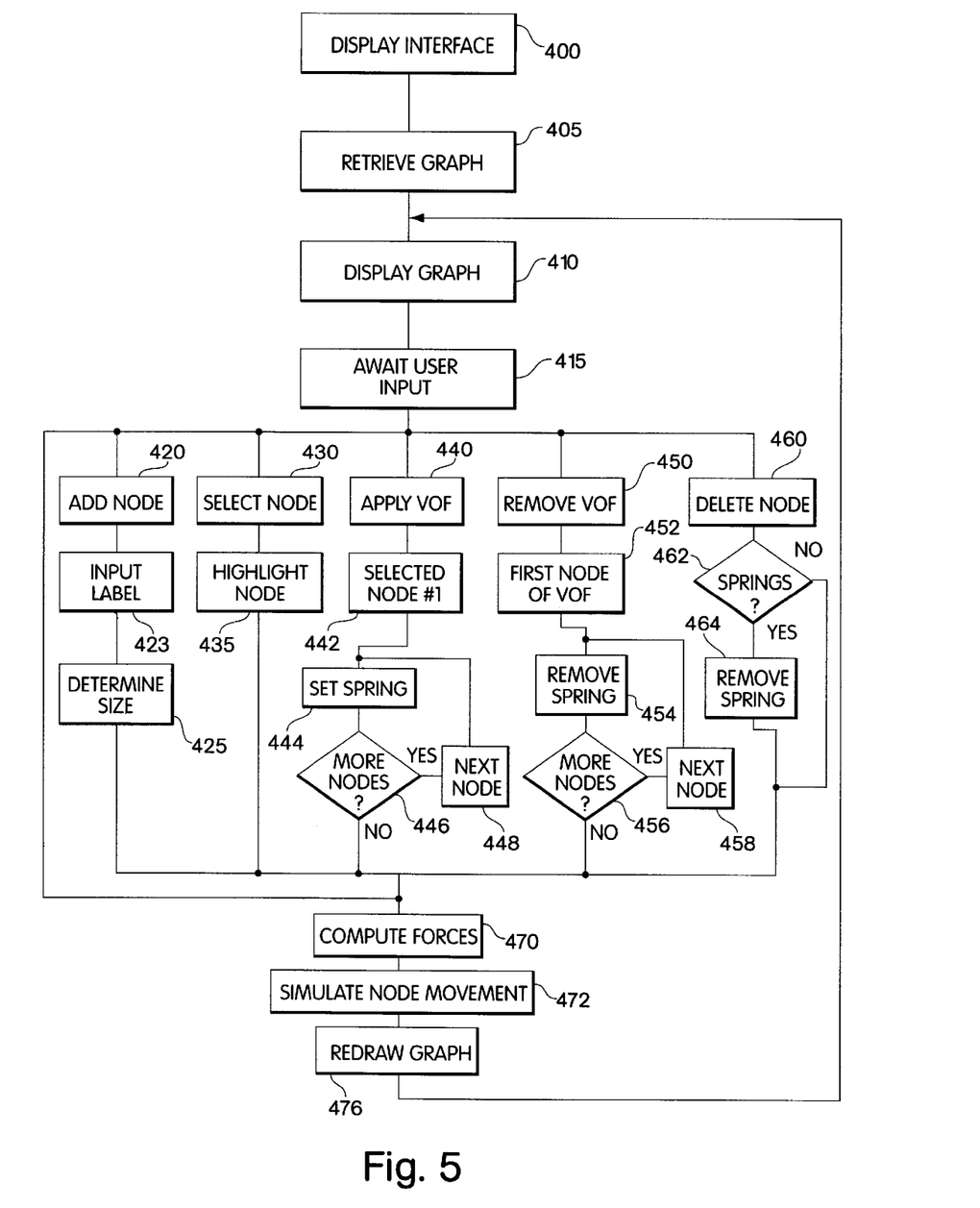
FIG. 5 is a flowchart describing operation of the present invention.

FIG. 5 illustrates a flow diagram describing operation of the system for drawing graphs according to the present invention. Initially, the drawing interface is displayed (step 400). The data for the graph is retrieved from memory (step 405) and displayed (step 410), if a preexisting graph is being used. If preexisting graph is not used, then the user is presented with a blank screen within the display of the interface 100 at step 410. The system then awits user input (step 405). The user can perform several steps, including changing nodes, selecting nodes, and adding constraints.

When a user wishes to add a node (step 420) or text label, the user selects the position and types in the label (step 423). A predefined global constraint is that each node must be of sufficient size to fit the label. The user may interactively set a different size larger than the minimum (step 425). Each node includes a box surrounding the label and can include a different color inside the box than the background. A text label is similar to a node, but does not include the surrounding box. However, VOFs can be applied to text labels as well as nodes.

When the user selects a node (step 430), the node is highlighted (step 435) on the display. The nodes must be selected, using steps 430, 435, before a VOF can be applied. When a VOF is to be applied (step 440), an appropriate spring is attached to each of the selected nodes (steps 444, 446, 448). Once the springs are attached, the system calculates forces on the node (step 470) to determine a steady state for all of the springs representing all of the VOF constraints. As a steady state is being calculated, the display may be updated to present intermediate positions being moved into the steady state position (step 472). Alternatively, the graph may simply be redisplayed at the final position (step 476).

If a VOF is to be removed (steps 450, et seq.), the springs are removed and the same process (steps 470, 472, 476) is repeated to find the current steady state for the graph. Also, if a node is removed (step 460), the corresponding springs to that node are removed and the graph is redrawn. Removal of a node can affect positions of other nodes since springs may act between the nodes.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A graph drawing system comprising:
   means for creating a plurality of nodes of a graph at specified locations of a visual representation of the graph;
   means for creating a plurality of edges between the plurality of nodes;
   means for visually representing the plurality of nodes at the specified locations and the plurality of edges;
   means for receiving user input identifying multiple visual organization features to be applied to selected ones of the plurality of nodes;
   means for adjusting locations of the plurality of nodes to organize the selected nodes according to the identified multiple visual organization features; and
   means for visually representing the nodes at the adjusted locations.

2. The graph drawing system of claim 1, wherein the multiple visual organization features include at least one of: a sequential placement of the selected nodes, a clustering of the selected nodes, a segregation of the selected nodes to a specified portion of the visual representation, a T-shaped configuration of the selected nodes, an alignment of the selected nodes along a line, an equal separation distance between the selected nodes, a symmetrical arrangement of the selected nodes, and a hub-shape configuration of the selected nodes.

3. The graph drawing system of claim 1, wherein the means for adjusting includes means for adjusting locations of the plurality of nodes in order to substantially meet all of the identified visual organization features.

4. The graph drawing system of claim 3, further comprising means for removing at least one of the plurality of visual organization features.

5. The graph drawing system of claim 1, further comprising means for receiving a user input to change a specified location of at least one of the plurality of nodes.

6. A method of creating diagrams, comprising the steps of:
   storing a plurality of visual organization features, each representing a different specific arrangement of related nodes;
   generating a diagram having a plurality of nodes, each at a respective one of a plurality of first locations, and edges connecting the plurality of nodes;
   selecting a set of related nodes from the plurality of nodes, the set of related nodes including less than all of the plurality of nodes;
   selecting multiple ones of the plurality of visual organization features; and
   modifying the diagram by relocating only nodes in the selected set of related nodes in accordance with the selected visual organization features.

7. A method according to claim 6, wherein:
   the diagram is modified by relocating the nodes in the selected set of related nodes so as to optimize the satisfaction of each of the selected visual organization features at each node in the selected set of nodes.

8. A method according to claim 6, further comprising the step of:
   applying a spring algorithm corresponding to the selected visual organization features to each node in the selected set of nodes;
   wherein the diagram is modified by relocating each node in the selected set of related nodes based on a result of the application of the spring algorithm to thereby optimize the satisfaction of each of the selected visual organization features at each node in the selected set of nodes.

9. A method according to claim 6, further comprising the step of:
   applying a respective force corresponding to each of the selected visual organization features to each node in the selected set of nodes; and
   computing a steady state condition of each node in the selected set of nodes in accordance with the applied respective forces at that node;
   wherein the diagram is modified by relocating each node in the selected set of related nodes based on a the computed steady state condition of that node.

10. The method according to claim 9, further comprising the steps of:

displaying the diagram; and displaying an intermediate movement of each node in the selected set of related nodes being relocated from its respective first location as the steady state condition of that node is being computed.

11. The method according to claim 6, further comprising the steps of:

displaying the diagram; and displaying a movement of each node in the selected set of related nodes being relocated from its respective first location.

12. A method according to claim 6, further comprising the steps of:

moving one of the relocated nodes to another location in accordance with a user command; and further modifying the diagram by further relocating only nodes in the selected set of related nodes based upon the selected visual organization features and the movement of the one relocated node to the other location.

13. A method according to claim 6, further comprising the steps of:

deleting one of the relocated nodes from the set of related nodes in accordance with a user command; and further modifying the diagram by further relocating nodes in only the selected set of related nodes with the one relocated node deleted, in accordance with the selected visual organization features.

14. A method according to claim 6, further comprising the steps of:

deleting one of the selected visual organization features in accordance with a user command; and further modifying the diagram by further relocating only nodes in the selected set of related nodes in accordance with the selected visual organization features with the one visual organization feature deleted.

15. A method according to claim 6, further comprising the steps of:

selecting another of the plurality of visual organization features; and further modifying the diagram by further relocating only nodes in the selected set of related nodes in accordance with the selected visual organization features and the selected other visual organization feature.

16. A method according to claim 6, further comprising the steps of:

anchoring one node in the selected set of nodes at a location in accordance with a user command; and wherein the diagram is modified by relocating only nodes in the selected first set of related nodes, excluding the one anchored node, in accordance with the selected visual organization features.

* * * * *